(12) United States Patent
Lehner et al.

(10) Patent No.: US 12,222,419 B2
(45) Date of Patent: Feb. 11, 2025

(54) RECONFIGURABLE GPR DEVICE

(71) Applicant: PROCEQ SA, Schwerzenbach (CH)

(72) Inventors: Samuel Lehner, Zürich (CH); Thomas Knorr, Zürich (CH); Michael Geiser, Zürich (CH); Isaak Tsalicoglou, Schwerzenbach (CH); Marcel Poser, Oberuzwil (CH)

(73) Assignee: PROCEQ SA, Schwerzenbach (CH)

( * ) Notice: Subject to any disclaimer, the term of this patent is extended or adjusted under 35 U.S.C. 154(b) by 0 days.

(21) Appl. No.: 18/374,780

(22) Filed: Sep. 29, 2023

(65) Prior Publication Data

US 2024/0027612 A1 Jan. 25, 2024

Related U.S. Application Data

(63) Continuation of application No. 17/101,934, filed on Nov. 23, 2020, now Pat. No. 11,914,029, which is a continuation of application No. PCT/EP2019/071688, filed on Aug. 13, 2019.

(51) Int. Cl.
G01S 13/931 (2020.01)
G01S 7/02 (2006.01)
G01V 3/12 (2006.01)
G01V 8/00 (2006.01)
H04W 4/40 (2018.01)
H04W 4/80 (2018.01)

(52) U.S. Cl.
CPC ............ G01S 13/931 (2013.01); G01S 7/024 (2013.01); G01V 3/12 (2013.01); G01V 8/005 (2013.01); H04W 4/40 (2018.02); H04W 4/80 (2018.02); G01S 2013/932 (2020.01); G01S 2013/9327 (2020.01)

(58) Field of Classification Search
None
See application file for complete search history.

(56) References Cited

U.S. PATENT DOCUMENTS

2006/0097905 A1   5/2006   Friborg et al.
2014/0285375 A1   9/2014   Crain
2020/0393557 A1  12/2020   Manneschi

FOREIGN PATENT DOCUMENTS

EP   1 197 762    4/2002
EP   2 720 065    4/2014
JP   H5-087940    4/1993
(Continued)

OTHER PUBLICATIONS

StructureScan Mini XT Manual, Geophysical Survey Systems, Inc. (Year: 2016).*

(Continued)

Primary Examiner — Whitney Moore
(74) Attorney, Agent, or Firm — GREENBLUM & BERNSTEIN, P.L.C.

(57) ABSTRACT

A reconfigurable ground penetrating radar (GPR) device, an autonomous GPR system and method of acquiring radar data about a medium. The GPR device includes a radar antenna with a first polarization, a processor unit connected to said antenna, a casing around the antenna and the processor unit, a wheel assembly including a holder, a wheel and a wheel rotation sensor. The wheel rotation sensor is connected to the processor unit and an axis of the wheel is pivotal relative to the first polarization.

17 Claims, 4 Drawing Sheets

(56) References Cited

FOREIGN PATENT DOCUMENTS

JP  2007-232735  9/2007
JP  2000-356684  12/2012

OTHER PUBLICATIONS

Lombardi et al., "Multi-Azimuth Ground Penetrating Radar Surveys to Improve the Imaging of Complex Fractures," Geosciences, vol. 8, No. 11, XP055667062; ISSN: 2076-3263 (Nov. 20, 2018) pp. 1-12.
Doerksen, "Improved Optical Positioning for GPR-based structure mapping," SPIE—International Society for Optical Engineering, Proceedings, vol. 4758 XP055667161, ISSN: 0277-786X (Apr. 12, 2002) pp. 503-507.
Chicarella et al., "Improvement of GPR Tracking by Using Inertial and GPS Combined Data," 2016 24th International Conference on Software, Telecommunications and Computer Networks (Softcom), University of Split, XP033017652, (Sep. 22, 2016) pp. 1-5.
Ferrara et al., "Design and Realization of a Cheap Ground Penetrating Radar Prototype @ 2.45GHz," 2016 10th European Conference on Antennas and Propogation (EUCAP), European Association of Antennas and Propogation, XP032906966 (Apr. 10, 2016) pp. 1-4.
GSSI [Geophysical Survey Systems, Inc.], Press Release, "New Palm Antenna for StructureScan™ Mini XT," (Nov. 27, 2017).
Geophysical Survey Systems, Inc., StructureScan™ Mini XT Manual, MN 70-813 Rev D, p. 28, (date not included on document).

* cited by examiner

RECONFIGURABLE GPR DEVICE

CROSS-REFERENCE TO RELATED APPLICATION

This application is a Continuation of U.S. patent application Ser. No. 17/101,934 filed Nov. 23, 2020, which is a Continuation of International Application No. PCT/EP2019/071688 filed Aug. 13, 2019, the disclosures of which are expressly incorporated by reference herein in its entirety.

BACKGROUND

1. Field of the Invention

The present invention relates to a reconfigurable GPR device, an autonomous GPR system and a method for acquiring radar data about a medium.

2. Discussion of Background Information

Ground penetrating radar (GPR) is commonly used for imaging a medium, i.e., generating images of the interior structure of the medium. In particular, such images contain information on the position and properties of layers, objects, cracks and/or voids in the medium. The underlying principle of GPR is the propagation of radar waves, e.g., with frequencies between 10 MHz and 10 GHz, which are emitted and received by at least one radar antenna. The propagation of radar waves is influenced by the structure and properties of the medium. In particular, radar waves are reflected at a boundary of materials with differing dielectric constant and/or diamagnetic constant. Hence GPR is commonly applied in non-destructive testing (NDT), e.g., on concrete, masonry, brickwork or wood. GPR is particularly useful for locating rebars or voids in building structures, such as houses and bridges.

Radar waves are further characterized by their polarization. In particular, radar waves may exhibit different directions of polarization. Orthogonally polarized radar waves may exhibit H-polarization (horizontal) or V-polarization (vertical). It is well known that the penetration depth of radar waves as well as the resolution of the resulting image vary with the polarization of the radar waves and dependent on the interior structure of the medium. Rebars in a concrete wall may serve as an example: Radar waves that are polarized along the rebars may not penetrate to deeper parts of the medium behind the rebars, i.e., further away from the antenna than the rebars, while radar waves that are polarized in across-direction relative to the rebars may actually penetrate to deeper parts. For practical applications, it may hence be beneficial to choose the polarization depending on the structure and depth range of interest.

Conventional GPR devices for NDT comprise handheld devices which can be operated on different surfaces, e.g., having different inclinations. Such handheld devices are e.g., known from EP 2 720 065 A1 and EP 1 197 762 B1. Changing the polarization of the emitted radio waves relative to the medium may be achieved by turning the device, e.g., by 90°, to switch between H-polarization and V-polarization.

However, such conventional GPR devices have several disadvantages. Firstly, they are quite big, heavy and bulky for a convenient operation by hand. Secondly, it is difficult—and often impossible—to acquire data in corners and around edges of a building structure. Thirdly, it is impossible to change the polarization for acquiring data on the same path with both H- and V-polarization. Fourthly, a refined processing and interpretation of the acquired radar data is impossible since information regarding the polarization is not regularly available in the data set.

SUMMARY

The problem to be solved by the present invention is therefore to provide a reconfigurable GPR device which allows acquiring radar data of different polarization along a defined path on a medium.

This problem is solved by a reconfigurable GPR device for acquiring radar data about a medium according to the invention. GPR means ground penetrating radar and includes the use of radar waves for imaging an interior structure of a medium, such as e.g., soil, rock, ice, concrete, wood or other building material. GPR for concrete structures is preferably operated within a frequency range between 50 MHz and 8000 MHz, in particular between 400 MHz and 6000 MHz. Preferably, the device acquires and processes the radar data in real-time, i.e., the time frame is on the order of milliseconds, in particular smaller than 1 s.

The device comprises a radar antenna with a first polarization, a processor unit, in particular an FPGA or a CPU, connected to said antenna and a casing around the antenna and the processor unit. The antenna is preferably adapted to emit and receive radar waves which travel through the medium, and to convert the received radar waves into radar data. Radar data are preferably a representation of the radar waves as an electric signal. The term "radar antenna with a first polarization" is used in the sense that the radar waves emitted by the antenna exhibit the first polarization. It shall explicitly include an antenna adapted to emit radar waves of different polarizations. The casing preferably protects the antenna and the processor unit, e.g., against at least one of dust and liquids. However, the casing does not necessarily have to be closed on all sides.

Furthermore, the device comprises at least one of a wheel assembly and a direction-determining unit. If present, the wheel assembly comprises a holder, a wheel and a wheel rotation sensor. The wheel rotation sensor is connected to the processor unit. An axis of the wheel is pivotal relative to the first polarization, i.e., a rolling direction of the wheel, and hence preferably of the device, may be changed by pivoting the wheel. This allows acquiring radar data with different polarizations along the same path, which may in turn improve the quality and resolution of the resulting image of the interior structure of the medium.

Preferably the wheel rotation sensor is adapted to sense a path length of the movement of the device, and in particular to determine positional information from the path length. The wheel rotation sensor may e.g., be a rotary encoder. The path length, and preferably positional information, is advantageously used in the display and/or interpretation of the radar data, e.g., for locating an object within the medium, e.g., a rebar or a void in concrete or a building structure.

If present, the direction-determining unit is connected to the processor unit and adapted to determine directional information. The directional information is descriptive of an angle between the direction of movement of the device and the first polarization. Such directional information may support the processing and/or the interpretation of the radar data. In particular, directional information is taken into account for processing and/or interpreting radar data with different polarizations acquired along the same path. Hence it is advantageous that the processor unit is adapted to generate a data set comprising the radar data and at least one of the positional information and the directional information.

The direction-determining unit may be adapted to determine directional information in different ways. In an embodiment, the wheel assembly comprises an angle sensor adapted to sense an angle between the axis of the wheel and the holder. In particular, the angle sensor is connected to the direction-determining unit. In another embodiment, the direction-determining unit is connected to a different directional sensor, e.g., an optical encoder, adapted to sense the direction of at least one of the movement and an acceleration of the device. Furthermore, the processor unit may be adapted to determine fused directional information from the directional information from different directional sensors. In the following, the term "directional sensor" is understood as including "orientational sensors" such as a compass sensor or an accelerometer.

As described above, it is advantageous that the device exhibits at least two preferred directions of movement in respect to the first polarization, such that the antenna is orientable in two distinct orientations relative to the direction of movement of the device. This allows to adjust the polarization of the radar waves for optimizing the quality and/or resolution of the resulting image, e.g., dependent on the interior structure of the medium.

In an embodiment, the wheel (i.e., its axis) exhibits two stable orientations, in respect to the casing, differing by a pivoting angle, which may e.g., be 90°, in particular to enable emitting waves with H- and V-polarization. Preferably, other orientations of the wheel different from the two stable orientations are unstable. In particular, a stable orientation requires applying a torque or a force above a given threshold in order to change the orientation. Such stable orientation may e.g., be achieved by means of a snap-in mechanism, e.g., implemented by an elastic force, such as from a spring, or of a magnetic force, which needs to be overcome to change the orientation.

In an advantageous embodiment, the wheel assembly is removably attachable to the casing, i.e., it can be non-destructively attached to and removed from the casing. In particular, the wheel assembly may be attachable to several side walls of the casing. This allows to change the polarization relative to the movement of the device by attaching the wheel assembly to a different side wall. Preferably the wheel assembly is attachable manually, in particular by snap-in. "Manually" means that attaching and/or detaching may be done with bare hands, i.e., without using any tools, such as a screw-driver. "Snap-in" describes a fastener, wherein the attached wheel assembly can only be detached if a detaching force is larger than a certain threshold. Such snap-in may e.g., be achieved by means of an elastic force, e.g., via a spring, or of a magnetic force.

In another embodiment, the device comprises a communication unit adapted to transmit the radar data to a remote computing unit via a wireless connection, in particular wherein the wireless connection comprises Wi-Fi or Bluetooth. Preferably the communication unit is one of located in the casing or part of the device.

A further aspect of the invention relates to an autonomous GPR system for acquiring radar data. The system comprises the device described above and a power supply unit electrically connected to the device and adapted to supply power to the device. In particular, the power supply unit may be attachable to the device, preferably manually attachable. The power supply unit may comprise at least one battery, e.g., at least one rechargeable battery. Such system is autonomous in the sense that it may be operated autonomously, i.e., without cables attached. The system may be connected to a separate electronics apparatus, e.g., a remote computing unit and/or a unit with a display. This facilitates a simple use as well as its application to areas which are not easily accessible, such as corners in building structures.

Yet another aspect of the invention relates to a method for acquiring radar data about a medium, in particular for operating the device described above. The method comprises the steps of moving a GPR device comprising a radar antenna along the medium, repetitively emitting radar waves of a first polarization into the medium by means of the antenna, repetitively receiving radar waves by means of the antenna, and converting the received radar waves to radar data. Furthermore, it comprises at least one of the steps of changing an angle between a direction of movement of the device and the first polarization (and repeating the above steps), and determining directional information descriptive of an angle between a direction of movement of the device and the first polarization.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description refers to the annexed drawings, wherein.

DETAILED DESCRIPTION

Figures 1, 2:
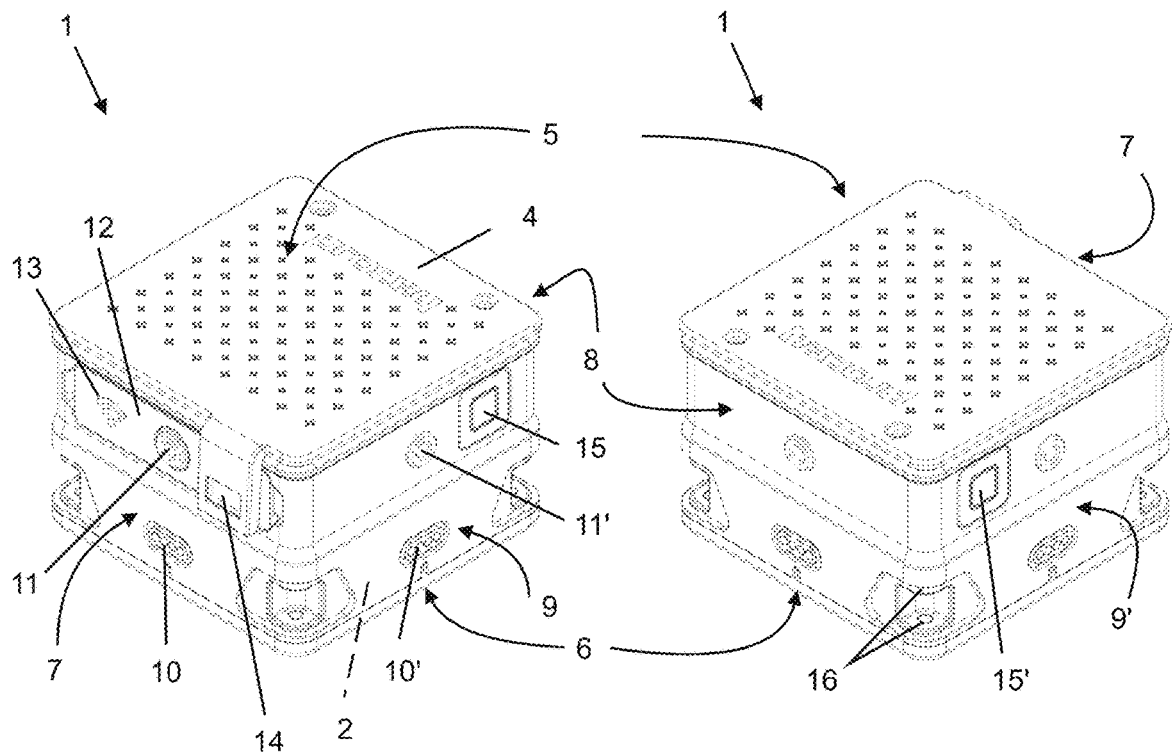
FIGS. 1 and 2 show perspective views of a reconfigurable GPR device according to an embodiment of the invention from the rear and the front side, respectively.

FIGS. 1 and 2 show perspective views of a reconfigurable GPR device 1 according to an embodiment of the invention from the rear and the front side, respectively. The reconfigurable GPR device 1 for acquiring radar data about a medium comprises a casing 4 surrounding a radar antenna 2 (indicated as dashed line) and a processor unit (not shown) connected to the antenna. Including the processor unit in the device 1 makes the device 1 autonomous, i.e., the GPR is not a "slave" to another external device, e.g., via cables. The antenna 2 is adapted to emit and receive radar waves of a first polarization (the antenna "has" a first polarization). The casing 4 comprises a top side 5, a bottom side 6 opposing the top side 5, and four side walls, namely a rear side wall 7, a front side wall 8 opposing the rear side wall 7, and two lateral side walls 9 and 9' opposite to each other. In general, the casing 4 may alternatively comprise more or less than four side walls. The antenna 2 is located in the lower part of the casing 4, i.e., nearer to the bottom side 6 than to the top side 5, preferably in the lowermost quarter of the casing 4. In general, the bottom side 6 corresponds to an emission side of the antenna 2, and the medium of interest is located adjacent (i.e., "below") the bottom side 6 when the device 1 is in operation, i.e., acquiring radar data about the medium.

Preferably, the casing 4 of the device 1 is made of a durable and/or rugged material, e.g., of a polycarbonate such as Lexan, such that the device is not damaged under harsh operating conditions in field usage. It is advantageous that the casing 4 is dust-protected and/or protected against splashing of water, e.g., according to IP 54 or better according to IEC standard 60529. In particular, the bottom side 6 of the casing 4 is made of a scratch-resistant and preferably slippery material. Preferably, the bottom side 6 is easily interchangeable, e.g., by hand, meaning without using additional tools.

In an embodiment, the length, the width, and the height of the casing 4 are each smaller than 10 cm, and preferably smaller than 9 cm. The height of the casing 4, i.e., its dimension between the top side 5 and the bottom side 6, is preferably smaller than 8 cm, preferably smaller than 7 cm. Such dimensions make the device 1 ergonomic, and enable accessibility of tight spaces. In general, the device preferably is a handheld device, meaning that it may be operated when being held with the hands, preferably with one hand only. This allows the device 1 to be operated in areas which are difficult to access, e.g., corners of building structures, or between pipes suspended from a ceiling and the ceiling itself, or between pipes and other structural features. The small size and weight also allow the device 1 to be operated on vertical walls and in overhead situations.

In the embodiment of FIGS. 1 and 2, the casing 4 further comprises a connector 10, in particular a four-pin connector, on each side wall. Such connector may be used for communication with an assembly such as a wheel assembly, see FIGS. 3-6. Alternatively, the connector 10 may be used for communication with a different assembly, e.g., comprising a camera, in particular a CCD camera, or an optical mouse, particularly for determining the movement of the device 1. Further the casing 4 comprises a second connector 11, e.g., a threaded hole, for mechanical connection of the assembly on each side wall, e.g., by a screw on the assembly.

The casing 4 in FIGS. 1 and 2 additionally comprises a cap 12, e.g., a rubber seal, covering at least one slot. In particular, the device 1 comprises a slot for a communication unit 13, e.g., a Wi-Fi 802.11a/b/g/n device or a Bluetooth dongle, for communication with a remote processing unit. Also, the device 1 may comprise a further slot, e.g., a USB-C connector 14. The further slot may be adapted for communication, e.g., for data transfer, and/or for receiving power from a remote power supply.

The device 1 of FIGS. 1 and 2 further comprises buttons 15 and 15' on the lateral side walls 9 and 9'. The buttons are functionally connected to the processor unit for controlling the device 1. In particular, the user may control at least one of the following actions by merely pressing one of the buttons 15 and 15': switch the device on, start the acquisition of radar data, mark a specific location (e.g., the location of a rebar) during the acquisition (e.g., by pressing the button twice during a short time interval, e.g., within 1 s), and switch the device off (e.g., by pressing the button for a long duration, e.g., for more than 1 s). The presence of at least two buttons 15 and 15' allows for an ambidextral operation of the device, i.e., the device may be operated in a simple manner with the left hand and/or the right hand. In general, the device 1 may alternatively only comprise one button. The operation of the device by pressing just one button (or one of two or more equivalent buttons) is simple and makes the acquisition of radar data with the device user-friendly.

Figures 3, 4:
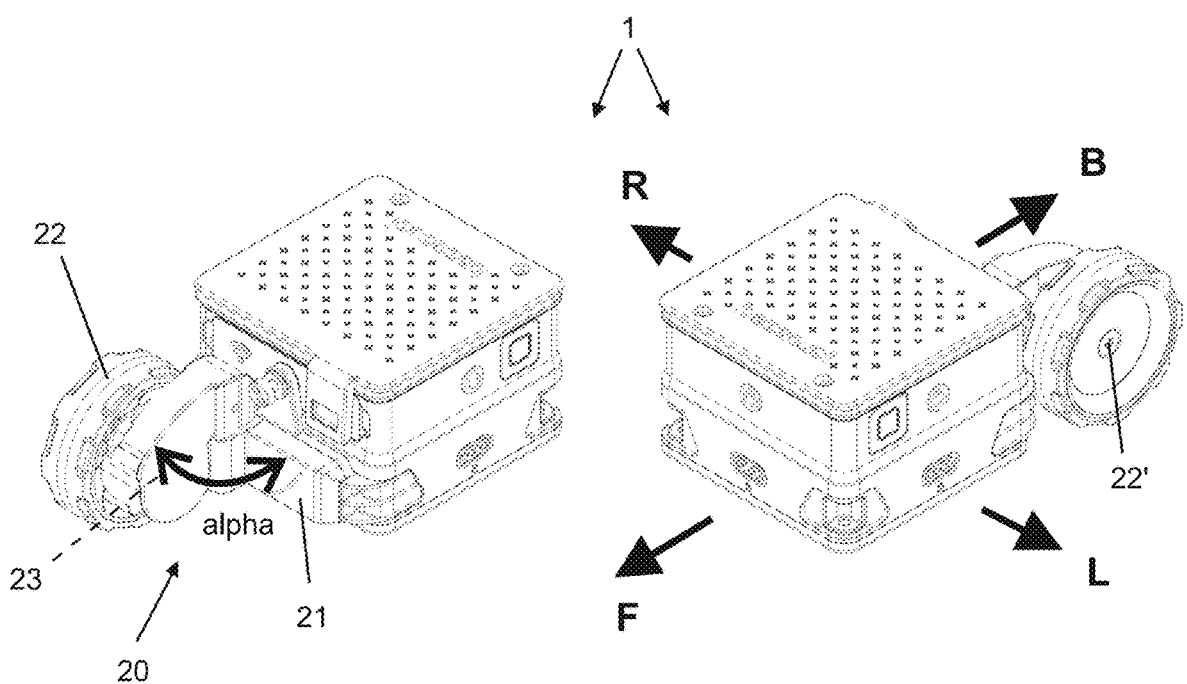
FIGS. 3 and 4 show perspective views of the device of FIGS. 1 and 2 additionally comprising a wheel assembly.

FIGS. 3 and 4 show perspective views of the device 1 of FIGS. 1 and 2 additionally comprising a wheel assembly 20. The wheel assembly 20 comprises a holder 21, a wheel 22 and a wheel rotation sensor 23 (indicated, but not visible on Figs.). The wheel rotation sensor 23 measures a quantity indicative of the rotation of the wheel 22 around its axis 24 (see FIG. 4). The wheel rotation sensor 23 may e.g., be a rotary encoder, and is connected to the processor unit (not shown in FIGS. 3 and 4). Preferably, the wheel rotation sensor 23 is adapted to sense a path length of the movement of the device. In particular, the wheel rotation sensor 23 is adapted to determine positional information from the path length, i.e., to determine coordinates of a position within a given frame of reference. Thus, the radar data may be linked to their respective position on the medium.

Further, the axis 24 (see FIG. 4) of the wheel 22 is pivotal relative to the casing 4, and hence to the first polarization. In particular, the wheel 22 has two stable orientations in respect of the casing 4, which differ by a pivoting angle α, which in particular is 90° as indicated by the bold arrow in FIG. 3. Thus, the device exhibits at least two preferred directions of movement in respect of the first polarization. As indicated by the bold arrows in FIG. 4, the device 1 may in particular be moved in the directions forward F (trailing wheel), backward B (leading wheel), left L and right R (both with the wheel in side-car configuration, not shown). Note: In side-car configuration, the axis 22' of the wheel 22 is perpendicular to the side wall which the wheel assembly 20 is attached to; in trailing and leading wheel configurations, the axis 22' is parallel to that side wall. Thus, the polarization of the radar data acquired along a same path may be changed, e.g., from H- to V-polarization or vice versa, by pivoting the wheel from trailing/leading wheel to side-car configuration and measuring along the same path a second time. Radar data with different polarizations may in turn yield a better resolution and/or quality of data about the medium, in particular in specific depth ranges of the medium.

As is understood from FIGS. 3 and 4, the wheel assembly 20 may alternatively be attached to a different side wall of the device than the rear-side wall 7 (shown). Also, in this way, the polarization of the acquired radar data may be changed when measuring a second time along the same path. Preferably, the wheel assembly 20 is removably attachable to the casing 4. In general, the wheel assembly 20 may be attachable to several, in particular to at least four (as shown), of the side walls. It is advantageous that the wheel assembly 20 is attachable (and removable) to (and from) the casing 4 manually, i.e., by hand, without using additional tools. Such mode of attaching is simple and time-saving, and it may in particular be implemented by a snap-in. An embodiment of such snap-in mechanism is shown in FIGS. 5 and 6.

Figure 5:
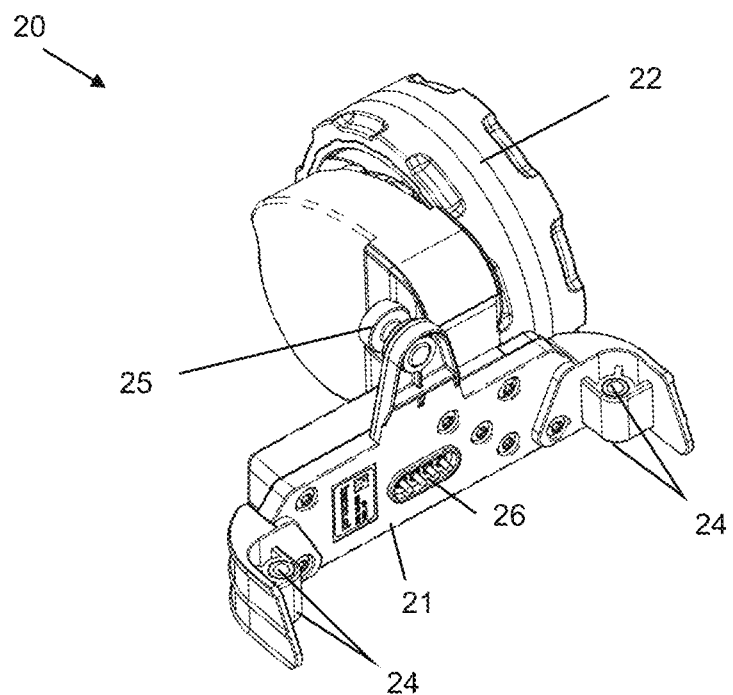
FIGS. 5 and 6 show perspective views of a wheel assembly according to an embodiment of the invention.
Figure 6:
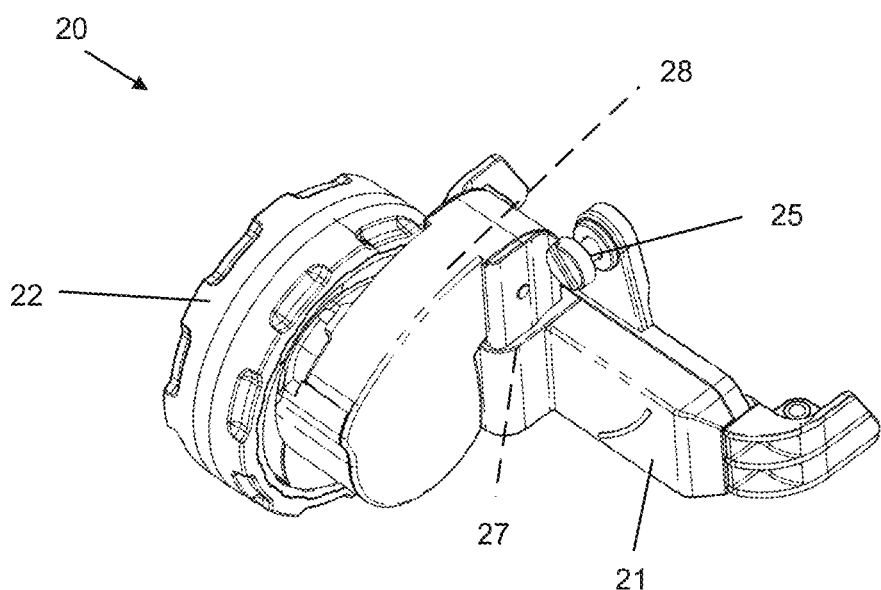

FIGS. 5 and 6 show perspective views of a wheel assembly 20 according to an embodiment of the invention. The holder 21 comprises four balls 24 which are mounted to the holder with a spring. The balls 24 fit into corresponding indentations 16 in the casing 4 (see FIG. 2) such that snapping the balls 24 into the indentations 16 leads to a mechanical connection between wheel assembly 20 and casing 4. Alternatively, such snap-in mechanism may be implemented via magnets on the holder 21 and on the casing 4. Further, the holder 21 comprises a screw 25 which is adapted to interlock with the second connector 11 on the casing 4. Thus, the screw 25 may be used to fix the wheel assembly 20 on the casing 4. Advantageously, the screw 25 can be screwed into the casing 4 manually, i.e., without using further tools. The holder 21 further comprises a plug 26 adapted to set up an electrical connection between the wheel assembly 20 and components within the casing 4 when plugged into the connector 10.

Preferably, the wheel assembly 20 comprises a suspension 28 for the wheel 22. The suspension 28 is elastic, e.g., implemented by a spring, and adapted to press the wheel 22 against the surface of the medium while the device 1 is moved along the medium. This makes the path length and the positional information determined from measurements of the wheel rotation sensor 23 more accurate and reliable, e.g., in case of surface roughness.

Figure 7:
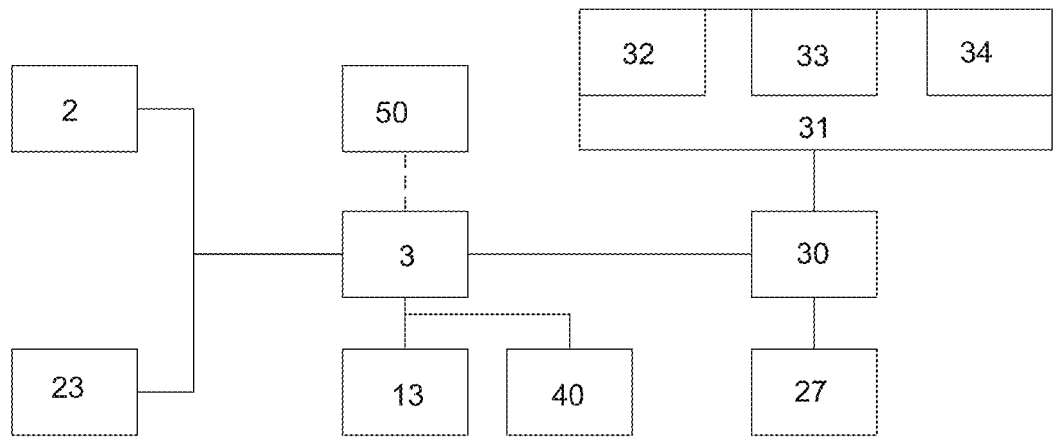
FIG. 7 shows a block diagram of a GPR device or GPR system according to an embodiment of the invention.

In an embodiment, the device 1 may comprise a direction-determining unit. FIG. 7 shows a block diagram of a GPR device according to an embodiment of the invention including such direction-determining unit 30. The direction-determining unit 30 is connected to the processor unit 3 and adapted to determine directional information. The directional information is descriptive of an angle between the direction of movement of the device and the first polarization. In that case, it is advantageous that the wheel assembly 20 comprises an angle sensor 27 (indicated in FIG. 6) adapted to sense an angle between the axis 22' of the wheel and the holder 21. The angle sensor 27 is connected to the direction-determining unit 30 and may e.g., be a resistive or capacitive angle sensor.

As an alternative or in addition to the angle sensor 27 in the wheel assembly 20, the direction-determining-unit 30 may be connected to a directional sensor 31 which is adapted to sense the direction of at least one of the movement and an acceleration of the device 1. The directional sensor 31 may comprise at least one of the following components: (i) It may comprise a camera 32, i.e., an optical encoder e.g., with a CCD camera, with a camera view directed at least partly towards the bottom side 6 of the casing 4. In that case, the direction-determining unit 30 is adapted to determine the directional information from subsequent images taken by the camera 32, e.g., by conventional image processing techniques, in order to retrieve the direction of movement and/or acceleration of the device 1. Advantageously, the surface of the medium exhibits a texture that facilitates the retrieval of the direction. (ii) The directional sensor 31 may comprise an accelerometer 33, e.g., a piezoelectric, piezoresistive or capacitive component. In that case, the direction-determining unit 30 is adapted to determine the direction of acceleration of the device. (iii) The directional sensor 31 may comprise a compass sensor 34, i.e., a sensor measuring a quantity indicative of the orientation of the sensor relative to a magnetic field direction in the surroundings, e.g., of the Earth's magnetic field. In general, the directional sensor 31 may be implemented in an assembly which is attachable to the housing 4 similar to the wheel assembly 20, e.g., an assembly with a camera, or it may be implemented within the housing 4, e.g., an on-board accelerometer of the device.

If more than one directional information is present, preferably the processor unit is adapted to determine fused directional information from the directional information from different directional sensors. The (fused) directional information is indicative of the polarization of the acquired radar data, e.g., H- or V-polarization. The directional information is helpful for the processing and/or interpretation of the radar data in order to determine a high-quality image of the interior of the medium. The processing and/or interpretation may e.g., take into account the polarization of the acquired radar data and/or differ depending on said polarization. Thus, it is preferred that the directional information is stored and/or transmitted together with the radar data.

In general, the directional information is not only indicative of the polarization of the acquired radar data, but it may also be used to reconstruct the measurement path, i.e., the actual path along which the device is moved during acquiring the data. Also, the directional information may comprise information about the orientation in which the device is used, e.g., on a floor, on a wall, on a slanted surface, or in an over-head setting. Such information may be evaluated by the user and/or the manufacturer, and it may support the user with measurement and interpretation information, and the further development of the device and/or acquisition methods.

Further, the processor unit 3 is adapted to control the antenna 2, and to receive the radar data from the antenna 2, as well as at least one of positional information from the wheel rotation sensor 23, if present, and directional information from the direction-determining unit 30, if present, see FIG. 7. The radar data may be stored in an internal memory 40 of the device 1 or transmitted via a communication unit 13 together with at least one of the positional information and the directional information. For that purpose, the device preferably may further comprise a communication unit 13 adapted to transmit the radar data to a remote computing unit via a wireless connection, e.g., via Wi-Fi 802.11a/b/g/n or Bluetooth. The remote computing unit may e.g., be a conventional computer or an iPad, preferably equipped with a software for processing the radar data and/or for determining an image of the interior structure of the medium from the radar data.

Preferably, the antenna 2 is a radar source with a frequency range between 50 MHz and 8000 MHz, in particular between 400 MHz and 6000 MHz. In particular, the processor unit 3 is configured to control the antenna 2 to emit a stepped-frequency continuous wave (SFCW).

In general, the device 1 does not need to comprise all units shown in the block diagram of FIG. 7. While the antenna 2 and the processor unit 3 are essential parts, different embodiments comprise only one or both of the wheel rotation sensor 23 and the direction-determining unit 30.

According to a further aspect of the invention, an autonomous GPR system for acquiring radar data comprises the device 1 as described above as well as a power supply unit 50 adapted to supply power to the device 1, see also FIG. 7. While power may be supplied to the device 1 via the slot 14, e.g., via a USB-C cable (see FIG. 1), it may be advantageous for certain applications to have the power supply unit 50 attached to the device 1.

Figure 8:
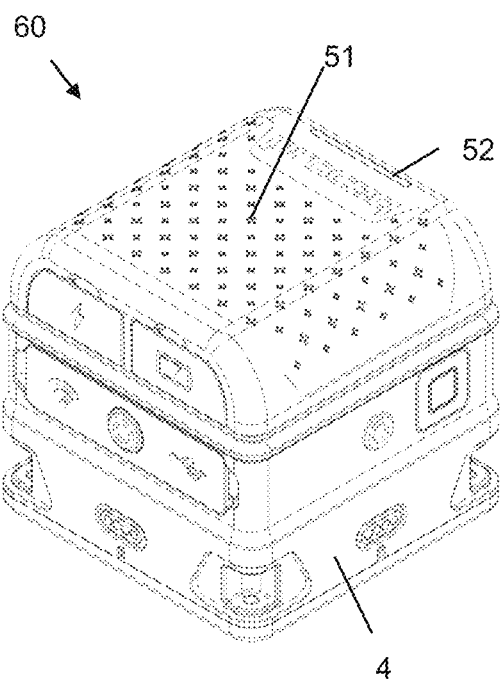
FIGS. 8 and 9 show perspective views of an autonomous GPR system according to an embodiment of the invention comprising a power supply unit.
Figure 9:
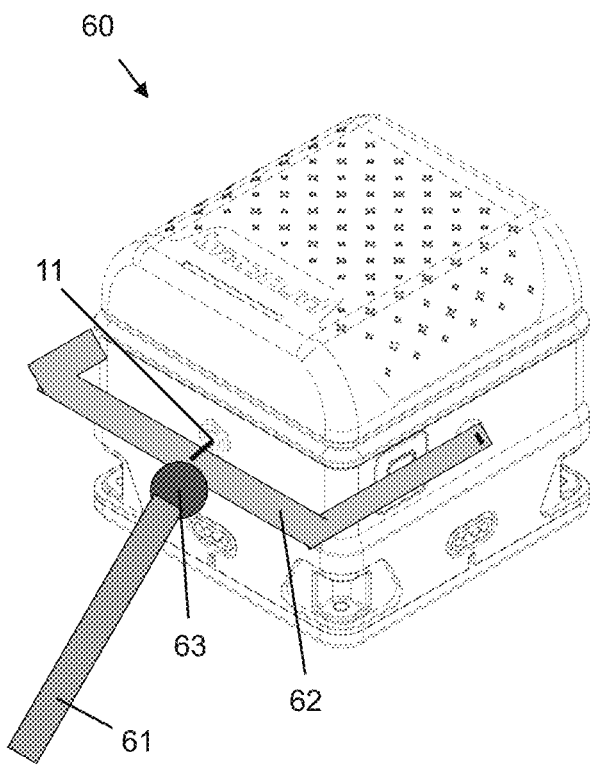
Figure 10:
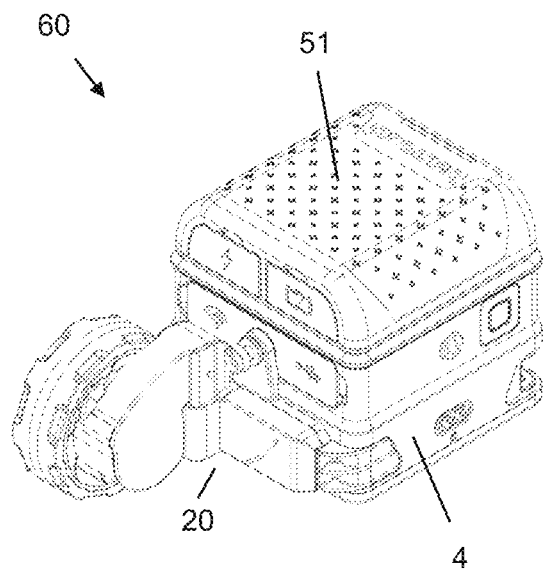
FIGS. 10 and 11 show perspective views of the system of FIGS. 8 and 9 additionally comprising a wheel assembly.
Figure 11:
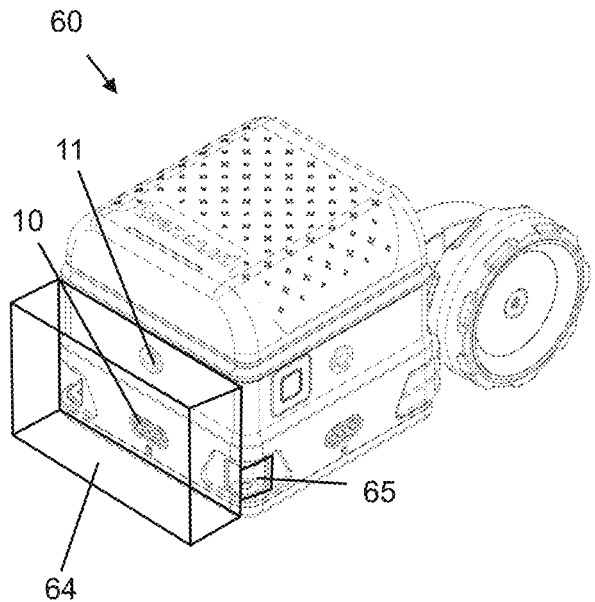

FIGS. 8 and 9 show perspective views of such autonomous GPR system 60 according to an embodiment of the invention comprising a power supply unit 50 in form of a battery pack 51. Preferably, the battery pack 51 is manually attachable to the casing 4, e.g., by a snap-in mechanism. In a particular embodiment, the snap-in mechanism is implemented via magnets, e.g., three magnets. The battery pack 51 may comprise conventional batteries, e.g., rechargeable NiMH batteries. This has the advantage that such batteries are available in most places and that the system is easily transportable, even e.g., on airplanes. Advantageously, the battery pack 51 has a height of less than 2 cm measured from the top side 5 of the device 1. Thus, the autonomous system 60 is small in size and light-weight in order to be handy to operate in inaccessible areas, such as e.g., corners of building structures, underneath piping, or in over-head situations. Further, the battery pack 51 may comprise a light pipe 52, wherein the colour or lighting pattern of one or more LEDs indicates an operating state of the device 1, such as e.g., "booting up", "switched on", "ready to acquire data" or "acquiring data". The one or more LEDs may be located in the casing 4 or in the battery pack 51. FIGS. 10 and 11 show perspective views of the system of FIGS. 8 and 9 additionally comprising a wheel assembly 20 as e.g., shown in FIGS. 5 and 6.

Advantageously, the autonomous GPR system 60 additionally comprises a rod 61 for holding the device 1, see FIG. 9. This allows simpler operation in inaccessible areas. In an embodiment, the casing 4 of the device 1 comprises a connector, e.g., the second connectors 11 (see FIG. 1), and the system 60 further comprises a rod 61 with a joint 62 attachable, in particular manually attachable, to the connector. In an embodiment, the rod 61 is screwable to three of the four second connectors 11, one on each side wall of the casing 4. The rod 61 is adapted to hold the device. Preferably the joint 62 comprises a ball joint 63, which facilitates that the device 1 follows the surface of the medium while being moved along the medium. Also, it is advantageous that the rod 61 comprises a telescopic rod, which is adjustable in length, e.g., up to 2 m of length.

In an embodiment, the GPR system 60 additionally comprises an inductive sensor 64 adapted to sense an electromagnetic field, see FIG. 11. In particular, the inductive sensor 64 is adapted to determine a presence of a cable or a pipe from the sensed electromagnetic field. Preferably, the inductive sensor 64 converts the strength of a magnetic or electrical field into a proportional value, which may be evaluated in terms of the presence of a cable or pipe. For that purpose, the inductive sensor 64 may operate passively, i.e., without transmitting an electromagnetic field. In particular, the inductive sensor 64 is adapted to sense an electric or magnetic field at a frequency between 45 Hz and 65 Hz, preferably around 55 Hz, in order to be able to detect cables with AC currents at 50 Hz or 60 Hz. In a different embodiment, the inductive sensor 64 may be adapted to transmit an electromagnetic field, which in particular induces electrical currents in the metallic objects, e.g., cables or pipes, in the vicinity. Such active transmission facilitates the location of objects which are not live wires, wherein a live wire is a wire with a load, i.e., carrying electric current. In that case, a signal generator is preferably used to generate an excitation of the object, in particular wherein a trace frequency of the excitation is between 400 Hz and 800 Hz or between 4 kHz and 150 kHz. In general, the inductive sensor 64 is preferably attachable to the device 1 via a holder 65. The mechanism of the holder 65 may be similar to the one of the holder 21 of the wheel assembly, see above, i.e., preferably manually attachable, e.g., by snap-in. Additionally or alternatively, the inductive sensor 64 may be fixed on the device 1 with a screw screwable into the second connector 11. An electrical connection between the inductive sensor 64 and the device 1, in particular with the processor unit 3, is preferably set up via the connector 10.

Figure 12:
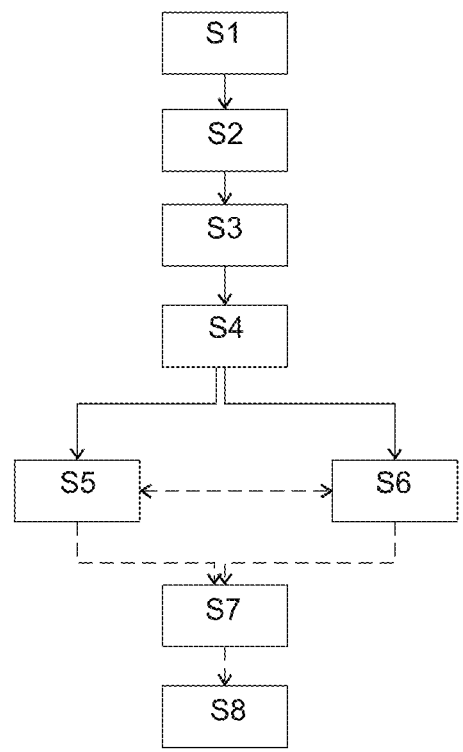
FIG. 12 shows a flow chart of a method for acquiring radar data about a medium according to an embodiment of the invention.

Yet another aspect of the invention relates to a method for acquiring radar data about a medium. FIG. 12 shows a flow chart of such according to an embodiment of the invention. In general, such method may be applied when operating the device or the system described above. The method comprises the following steps S1 to S4 and at least one of steps S5 and S6:

Step S1: Moving a GPR device comprising a radar antenna along the medium. In most cases, "moving along the medium" is to be understood as moving/pushing/dragging along a measurement path on the surface of the medium, in particular wherein the bottom side of the casing is in contact with the surface. In special applications, however, the casing of the device may not be in direct contact with the surface. In an embodiment, the device or the system is mounted to a vehicle following the measurement path, e.g., a drone, which facilitates acquiring radar data over a large or otherwise inaccessible area.

Step S2: Repetitively emitting radar waves of a first polarization into the medium by means of the antenna. The radar waves may be emitted as radar pulses, a continuous wave or stepped-frequency continuous wave. The first polarization is defined by the antenna and the control of the antenna through the processor unit.

Step S3: Repetitively receiving radar waves by means of the antenna. Preferably, the radar waves reflected by the medium, e.g., by boundaries between regions of different relative dielectric permittivity in the medium, are received by the same antenna that emits the radar waves. However, it is also feasible to separate an emitting antenna from a receiving antenna. Steps S2 and S3 are repeated multiple times when acquiring radar measurements.

Step S4: Converting the received radar waves to radar data, in particular wherein radar data are a representation of the radar waves as an electric signal. Step S4 may comprise converting analog data to digital data in preparation for data storage, transmission, or processing.

Step S5: Changing an angle between a direction of movement of the device and the first polarization, and repeating the above steps S1 to S4. By changing said angle, the polarization of the radar data is changed, e.g., from H- to V-polarization or vice versa. Acquiring differently polarized radar data may yield higher-quality images of the interior of the medium. In particular, differently polarized radar waves may penetrate into the medium up to different depth, i.e., distance from the antenna, depending on the reflection and/or absorption properties of the medium. Hence radar data with different polarizations may exhibit a high resolution in different depth ranges. Preferably, changing the angle between the direction of movement of the device and the first polarization comprises pivoting an axis of a wheel relative to the first polarization, in particular by a pivoting angle, and turning the casing by the pivoting angle. In general, e.g., if no wheel is present, the device may be turned by the pivoting angle, and then moved along the measurement path.

Step S6: Determining directional information descriptive of an angle between the direction of movement of the device and the first polarization. Such directional information characterizes the polarization of the acquired radar data, e.g., H- or V-polarization. Hence it is an important parameter and it may support the processing and/or interpretation of the radar data. Step S6 may comprise the sub-step of sensing the angle between the direction of the movement and the first polarization by means of a directional sensor. The directional information may be determined from measurements of different sensors, e.g., an angle sensor, a camera, an accelerometer or a compass sensor as described above. Step S6 may be performed alternatively or additionally to step S5.

Optionally, the method may comprise at least one of the following steps (dashed arrow lines indicate optional steps):

Step S7: Generating a data set comprising the radar data and the directional information. Such data set may then be stored in an internal memory of the device or transmitted to a remote computing unit as described above.

Step S8: Processing the radar data taking into account the directional information, and in particular generating an image of a structure, i.e., an interior structure, of the medium from the radar data taking into account the directional information. As described above, such processing may lead to a higher-quality image of the structure than conventional processing methods, in particular in the case of anisotropic reflection and/or absorption properties of the medium.

What is claimed:

1. A reconfigurable ground penetrating radar (GPR) device for acquiring radar data about a medium, comprising:
 a radar antenna with a first polarization,
 a processor unit connected to said antenna,
 a casing around the antenna and the processor unit, and
 a wheel assembly comprising a holder, a wheel and a wheel rotation sensor, wherein the wheel rotation sensor is connected to the processor unit, wherein an axis of the wheel is pivotal relative to the first polarization,
 wherein the wheel assembly is removably attachable to the casing,
 wherein the wheel assembly is attachable manually by snap-in connection, and
 wherein the device is a handheld device.

2. The device of claim 1, wherein the antenna is adapted to emit and receive radar waves which travel through the medium, and to convert the received radar waves into radar data.

3. The device of claim 1, wherein the wheel rotation sensor is adapted to sense a path length of the movement of the device, and in particular to determine positional information from the path length.

4. The device of claim 1, wherein the processor unit is adapted to control the antenna, and to receive the radar data as well as positional information from the wheel rotation sensor, and
 wherein the processor unit is adapted to generate a data set comprising the radar data and the positional information.

5. The device of claim 1, wherein the device exhibits at least two preferred directions of movement in respect of the first polarization.

6. The device of claim 1, wherein the wheel exhibits two stable orientations, in respect to the casing, differing by a pivoting angle,
 in particular wherein other orientations of the wheel different from the two stable orientations are unstable, and
 wherein the pivoting angle is 90°.

7. The device of claim 1, wherein the casing comprises side walls, in particular four side walls,
 wherein the wheel assembly is attachable to several, in particular to at least four, of the side walls.

8. The device of claim 1, wherein the wheel assembly comprises an angle sensor adapted to sense an angle between the axis of the wheel and the holder.

9. The device of claim 1, wherein the casing comprises a bottom side corresponding to an emission side of the antenna.

10. The device of claim 1, wherein the antenna is a radar source with a frequency range between 50 MHz and 8000 MHz, in particular between 400 MHz and 6000 MHz.

11. The device of claim 1, wherein the processor unit is configured to control the antenna to emit a stepped-frequency continuous wave.

12. The device of claim 1, wherein a length, a width, and a height of the casing are each smaller than 10 cm.

13. The device of claim 1, further comprising:
 a communication unit adapted to transmit the radar data to a remote computing unit via a wireless connection, in particular wherein the wireless connection comprises Wi-Fi or Bluetooth,
 in particular wherein the communication unit is located in the casing (4).

14. An autonomous GPR system for acquiring radar data, comprising:
 the device of claim 1,
 a power supply unit electrically connected to the device and adapted to supply power to the device,
 in particular wherein the power supply unit is attachable to the device, in particular manually attachable.

15. The system of claim 14, wherein the casing of the device comprises a second connector, and further comprises:
 a rod with a joint attachable to, in particular manually attachable to, the second connector, wherein the rod is adapted to hold the device, and
 wherein the joint comprises a ball joint, and in particular wherein the rod comprises a telescopic rod.

16. The system of claim 14, further comprising:
 an inductive sensor adapted to sense an electromagnetic field, in particular adapted to determine a presence of a cable or a pipe from the sensed electromagnetic field.

17. A method for acquiring radar data about a medium for operating the device of claim 1, comprising:
 moving a ground penetrating radar (GPR) device comprising a radar antenna along the medium,
 repetitively emitting radar waves of a first polarization into the medium by the antenna,
 repetitively receiving radar waves by the antenna,
 converting the received radar waves to radar data,
 changing an angle between a direction of movement of the device and the first polarization,
 repeating the moving, repetitively emitting radar waves, repetitively receiving radar waves, and changing the angle, and
 wherein changing the angle between the direction of movement of the device and the first polarization comprises pivoting an axis of a wheel relative to the first polarization.

* * * * *